United States Patent
Hartman et al.

[11] Patent Number: 6,158,999
[45] Date of Patent: Dec. 12, 2000

[54] ROTARY DIE

[76] Inventors: Steven Hartman, R.R. #2, Erin, Ontario, Canada, N0B 1T0; David Hartman, R.R. #4, Tottenham, Ontario, Canada, L0G 1W0

[21] Appl. No.: 09/130,369

[22] Filed: Aug. 7, 1998

[51] Int. Cl.[7] .................................................. B29C 47/00
[52] U.S. Cl. .................. 425/192 R; 425/381; 425/381.2; 425/382.3; 425/465
[58] Field of Search ................................ 425/382.3, 381, 425/466, 465, 381.2, 192 R

[56] References Cited

U.S. PATENT DOCUMENTS

| | | |
|---|---|---|
| 1,714,234 | 5/1929 | Ost . |
| 3,178,770 | 4/1965 | Willis ........................................... 18/12 |
| 3,584,342 | 6/1971 | Neuville ....................................... 18/12 |
| 3,810,728 | 5/1974 | Jacobs ....................................... 425/244 |
| 4,111,630 | 9/1978 | Shiomi et al. ............................ 425/462 |
| 4,548,567 | 10/1985 | Missout .................................... 425/113 |
| 4,806,086 | 2/1989 | Bloch et al. ............................. 425/114 |
| 4,832,588 | 5/1989 | Rasmussen ............................... 425/114 |
| 5,316,460 | 5/1994 | Murayama ............................... 425/110 |
| 5,401,454 | 3/1995 | Mendel ................................. 264/176.1 |
| 5,505,887 | 4/1996 | Zdrahala et al. ........................ 264/127 |

*Primary Examiner*—Harold Pyon
*Assistant Examiner*—Joseph S. Del Sole
*Attorney, Agent, or Firm*—Eugene J. A. Gierczak

[57] ABSTRACT

Apparatus for extruding an elongated article comprising a die having an opening therethrough; an extruder for discharging extrudable material through said die opening; structure for rotational movement between said die and said extruder so as to provide said elongated article having a rotational profile.

14 Claims, 2 Drawing Sheets

`6,158,999`

ROTARY DIE

DESCRIPTION

1. Field of Invention

This invention relates generally to apparatus and a method for extruding an elongated article having at least one spiral profile along the length of said elongated article; and further includes the extruded thermoplastic foam rod produced thereby having at least one helical profile along the length thereof.

2. Background Art

In the extrusion process a plastic resin melt is formed under heat and pressure. The melt is usually formed continuously by a rotating screw in a barrel which converts solid pellets of the resin or plastic into the flowable or extrudable material. A wide variety of additions may be incorporated into the extrudable material such as extenders, blowing agents, fire retardants, pigments and such.

Such extruder generally includes a hopper through which the extrudable material is introduced into the extruder, heating element to melt the extrudable material and a nozzle or opening from the extruder for communicating the extrudable material from the extruder to a die. The die may generally include a plenum chamber which then communicates with the die opening.

Various extruders and methods have heretofore been produced.

For example, U.S. Pat. No. 5,316,460 generally relates to synthetic resin material feeding apparatus for use in a system for forming a sealing liner on the inner surface of a top panel wall of container closure shelf which has an extruder and a gear pump. The driving mechanism the extruder and the gear pump have an intermittent rotation-driving output for intermittently operating the extruder and the gear pump.

Moreover, U.S. Pat. No. 5,401,454 generally illustrates an extrusion die and flow control method which incorporates a flow control in the form of a flow diverter which extends traversely across the flow path. The diverter forms part of a window upstream of the die lips and provides a slight tapering enlargement which may be moved along the window across the flow path from one side to the other or preferably from the center symmetrically outwardly or vice versa to divert flow from the center proportionally to the edges without changing the total cross-sectional area of the window.

Moreover, some of the prior art extruders included a rotational movement, however, none of such prior art extruders produce an article having at least one spiral profile along the length thereof.

For example, U.S. Pat. No. 4,832,588 teaches that material is threaded out into a space between a worm and a nozzle but since the nozzle core is locked against rotation the frictional engagement between the material and both the outer surface of the nozzle core will cause the material to stop rotating as it is forced further towards the nozzle.

Moreover, U.S. Pat. No. 5,505,887 illustrates rotating a portion of a die in a first rotational direction and rotating a mandrel in a second rotational direction so as to enhance helical fibrous formation of tubing material.

It is an object of this invention to provide an improved apparatus and method for producing elongated articles having a rotational profile.

It is an aspect of this invention to provide apparatus for extruding an elongated article comprising a die having an opening therethrough; an extruder for discharging extrudable material through said die opening; structure for rotational movement between said die and said extruder so as to produce said elongated article having a rotational profile.

In accordance with yet another aspect of the invention, to provide apparatus for extruding an elongated article having at least one spiral profile along the length thereof comprising a die having an opening; an extruder for discharging extrudable material through said die opening; structure for rotational movement between said die and said extruder so as to produce said elongated article having at least one spiral profile along the length of said elongated article.

It is another aspect of this invention to provide a method of producing an elongated foam rod having at least one helical profile along the length of said rod comprising a rotating a die opening relative to an extruder; selecting the die opening so as to impart the helical profile along said length of said foam tube.

It is another aspect of this invention to provide an extruded thermal plastic rod having at least one helical profile along the length thereof.

BEST MODE FOR CARRYING OUT THE INVENTION

Figure 1:
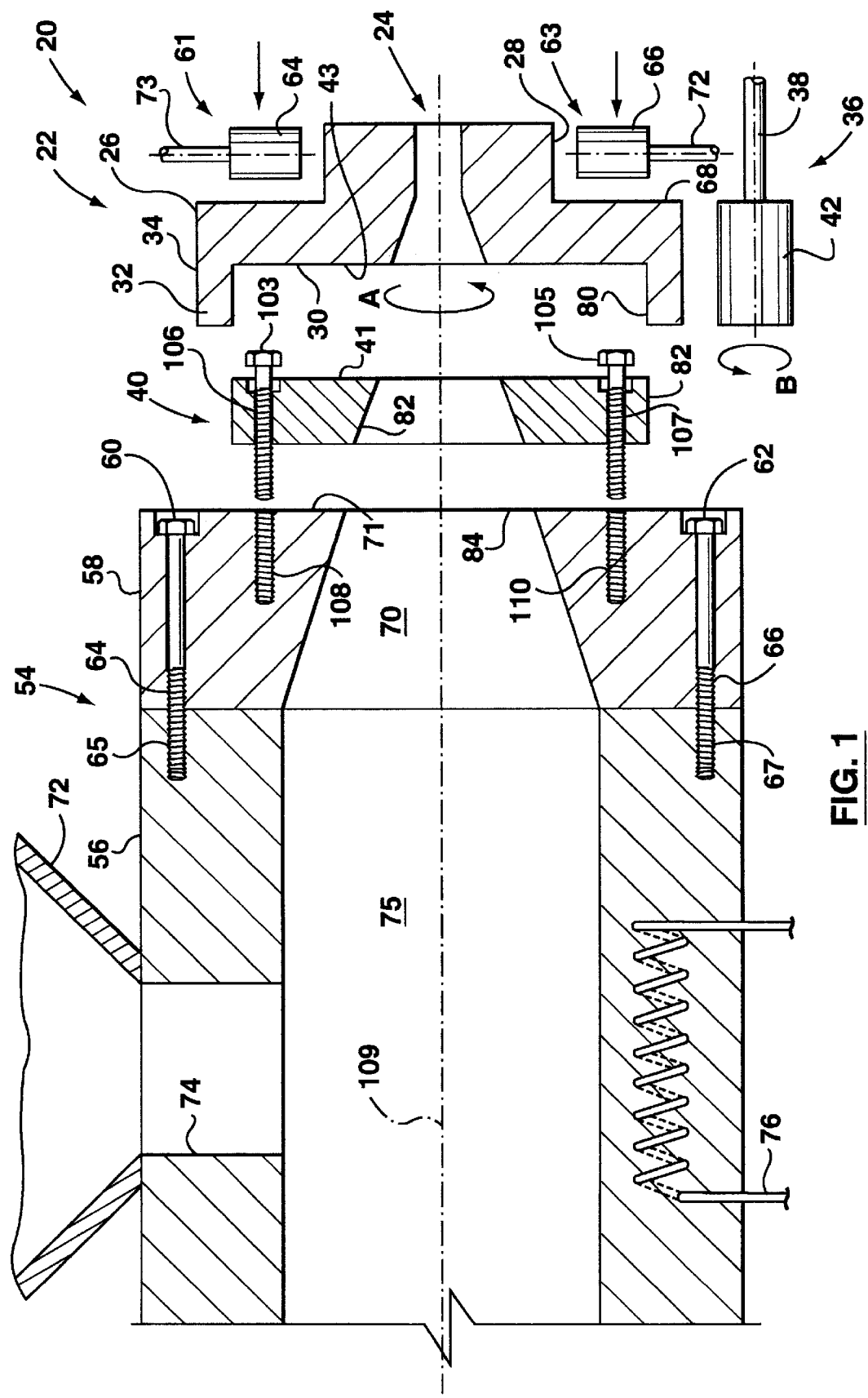
FIG. 1 is an exploded cross-sectional view of the apparatus.

In the description which follows, like parts are marked throughout the specification and the drawings with the same respective reference numerals. The drawings are not necessarily to scale and in some instances proportions may have been exaggerated in order to more clearly depict certain features of the invention.

FIG. 1 shows a cross-sectional view of an extruder 54. Extruder 54 contains extruding barrel 56, adaptor plate 58, a die 20.

The embodiment of the invention shown in FIG. 1 is adapted to discharge extrudable material that is melt flowable such as thermoplastic foam. Plastic elements or pellets (not shown) for example are poured into the extruder hopper 72 which communicates with the extruder hopper opening 74 disposed in the extruder barrel 56. The extruder hopper opening 74 communicates with the extruder bore 75. FIG. 1 shows schematically heating elements 76 to heat for example the plastic pellets to an appropriate temperature in a manner well known to those persons skilled in the art so as to produce a thermoplastic material such as thermal plastic foam in an extrudable form. FIG. 1 does not show the rotating screw in the barrel which is well know to those persons skilled in the art.

In the embodiment shown in FIG. 1, there is shown an adaptor plate 58 which is connected to the extruder barrel 56 by means of a plurality of screws such as screws 60 and 62 which engage with the plurality of screw holes such as screw holes 64 and 66 disposed in the adaptor plate 58. The screw holes 64 and 66 communicate with corresponding screw holes 65 and 67 disposed in the extruder barrel 56. The adaptor plate 58 also includes an extrusion orifice 70 which communicates with bore 75. The adaptor plate 58 also includes a front die wall 71.

The embodiment shown in FIG. 1 also shows the die 20 which generally illustrates a die body 22 which includes a die opening or orifice 24. The die body 22 includes a first cylindrical die body 26 and a second cylindrical die body 28. The cylindrical die body 26 includes a cylindrical recess 30 which is adapted to receive a bearing member 40 in the manner to be described hereinafter. The cylindrical die body 26 also includes a gear profile 32 presented by the outer cylindrical surface 34. The gear 32 of die 20 is adapted to be driven by drive means for radial engagement for rotational movement between said die and said extruder. Said driving means 36 consist of a pinion shaft 38 connected to a motor (not shown). The driven pinion shaft 38 is adapted to rotate a drive gear 42 in direction B which meshes with the gear 32 thereby causing the die 20 to rotate in a direction A relative the extruder 54.

The bearing member 40 is adapted to be secured to the adaptor 58 by means of screws 103 and 105 which are received by holes 106 and 107 passing through the bearing member 40 and releasably secured into holes 108 and 110 of adaptor plate 58. In the preferred embodiment the bearing member 40 can be comprised of a material such as bronze by way of an example. However, other materials can be used so as to provide a bearing surface 41 between the rotation of the die 20 and the bearing member 40 in a manner to provide good sliding movement there between as well as provide a surface to minimize any leakage of thermoplastic material between the bearing member 40 and die 20. The bearing surface also includes a bore 82 which communicates with bore or extruder orifice 70 and die 20.

The die 20 includes a recess 30 which is adapted to capture and receive bearing member 40. The bearing member 40 actually comprises a bearing cylinder which comprises a bearing surface 41 which is adapted to slidingly mate against die surface 43 to provide good sliding movement there between in the manner so as to minimize any leakage of flowable material there between. Said bearing surface intersects die opening 24, as shown in FIG. 1.

The die 20 is forced against the bearing surface 41 and in particular against extruder barrel 56 by means of cam followers 61 and 63 which are comprised of rollers 64 and 66 respectively as retaining means which are adapted to press against the die surface 68 so as to hold die 20 against the bearing member 40 in a tight sealing fashion.

The depth of the recess wall 80 is dimensioned so as to be approximately equal or slightly less than the depth of the bearing member wall 82 so that frictional slidable movement occurs between the bearing surface 41 and recessed die surface 43 rather than between the die 20 and adaptor plate 58.

Accordingly in order to assemble the apparatus herein the adaptor plate 58 is secured to the extruder barrel 56 by means of the screws 60 and 62 as described hereinbefore.

Thereafter the bearing member 40 is secured to the adaptor plate 58 by means of screws 103 and 105 as hereinafter described.

Thereafter the die 20 is placed or mounted over the bearing member 40 so as to capture the bearing member 40 within the recess 30. The die 20 is securedly held against the bearing member 40 for rotational movement thereby by means of the use of cam followers 61 and 63. The cam followers are adapted for rotational movement about shafts 72 and 73.

Extrudable material is therein forced through the extruder barrel 56 and orifice 70 and 82 to the die opening 24.

Figure 7:
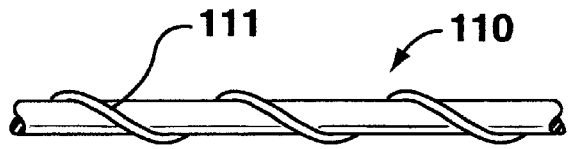
FIG. 7 shows one embodiment of a foam tube having at least one spiral profile along the length thereof.

The contour of die opening 24 is selected so as to produce an extruded thermoplastic foam rod 110 having at least one helical profile 111 along the length thereof as shown in FIG. 7.

Figure 2:
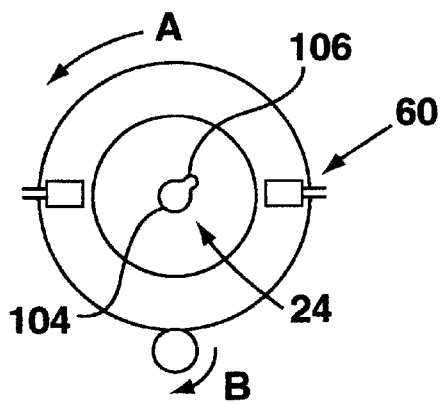
FIG. 2 illustrates a nozzle having at least two circular openings.

By way of example, the die opening may be selected so as to present two openings as shown in FIG. 2. In particular the openings of FIG. 2 illustrate one main opening 104 which communicates with a second opening 106. The opening 104 may be concentric with the axis of the extruder 108. The arrangement of the openings of FIG. 2 will produce the extruded thermoplastic foam rod 110 shown in FIG. 7 which illustrates at least one helical profile 111 along the length thereof. A plurality of helical profiles or spirals can be produced along the length of the thermoplastic foam rod by using for example the die opening of FIG. 6.

Figure 3:
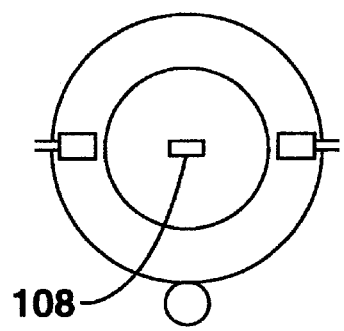
FIG. 3 is a drawing of a nozzle showing slot.

However, the die opening may be a slot 109 as shown in FIG. 3 which will also produce a helical rod.

Figure 4:
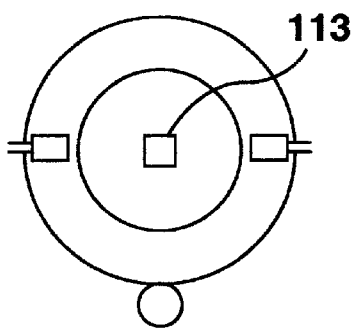
FIG. 4 is a drawing of a nozzle illustrating four round openings.
Figure 5:
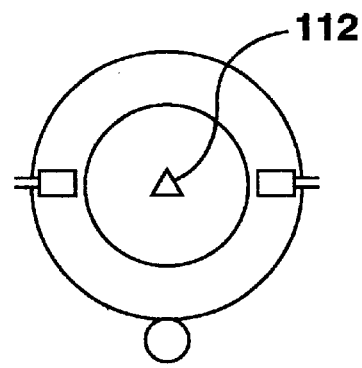
FIG. 5 is another view of the nozzle openings.
Figure 6:
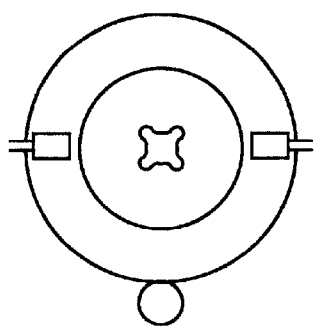
FIG. 6 is another illustration of nozzle openings.

Other arrangements are illustrated in FIGS. 4, 5, and 6. Any arrangement or opening can be used such as a triangle 112, square 113 or multi-sided opening as well as a multiplicity of round circles as shown in the drawings. Moreover, a non-circular opening could be used.

Accordingly the apparatus as shown herein is utilized for extruding an elongated article 110 which apparatus comprises a die 20 having a die opening 24 as well as an extruder 54 for discharging the extrudable material through the die opening 24. Means 36 are provided for rotational movement between the die 20 and the extruder 54 so as to produce the elongated article having a rotational profile 111 which consists of a helical ridge extending along the length of the extruded material 110.

The materials used for the extruder barrel 56, die 20 and adaptor plate 58 can comprise of a number of metals which are well known to those skilled in the art and generally consists of stainless steel or other high strength materials. The bearing material as shown in the preferred embodiment consists of bronze but other material may also be used.

Moreover the die hole or orifice 24 utilized herein consists of a variety of shapes so long as it produces at least one helical profile along the length of the extruded member.

The extruded rods 110 made from the apparatus and method described herein can be used as water toys such as foam water logs, by way of example.

Various embodiments of the invention have now been described in detail. Since changes in and/or additions to the above-described best mode may be made without departing from the nature, spirit or scope of the invention, the invention is not to be limited to said details.

What is claimed is:

1. An apparatus for extruding an elongated article having at least one spiral profile along the length thereof comprising;

(a) a die having a die opening and a recess;

(b) extruder for discharging extrudable material through said die opening;

(c) means for radial engagement for rotational movement between said die and said extruder so as to produce said elongated article having at least one spiral profile along the length of said elongated article;

(d) adaptor plate secured to said extruder comprising a bearing surface; and (e) retaining means for retaining said die between said retaining means and adaptor plate wherein said recess receives said bearing surface and said die bears against said bearing surface.

2. Apparatus for extruding an elongated article having a rotational profile comprising:

(a) a die having an opening;

(b) extruder for discharging extrudable material through said die opening;

(c) means for radial engagement for rotational movement between said die and said extruder so as to produce said elongated article having a rotational profile;

(d) an adaptor plate secured to said extruder;

(e) a bearing surface secured to said adaptor plate;

(f) said bearing surface extending along a plane intersecting said die opening; and (g) said die including a recess for receiving said bearing surface.

3. Apparatus as claimed in claim 2 wherein said die opening imparts at least one spiral profile unto said extruded article.

4. Apparatus as claimed in claim 3 wherein said die opening is rectangular.

5. Apparatus as claimed in claim 3 wherein said die opening is triangular.

6. Apparatus as claimed in claim 3 wherein said die opening is multi-sided, or non-circular.

7. Apparatus as claimed in claim 3 wherein said die opening includes at least two circular openings.

8. Apparatus for extruding an elongated article having at least one spiral profile along the length thereof comprising;

(a) a die having an opening;

(b) extruder for discharging extrudable material through said die opening;

(c) means for radial engagement for rotational movement between said die and said extruder so as to produce said elongated article having at least one spiral profile along the length of said elongated article;

(d) an adaptor plate secured to said extruder;

(e) a bearing surface secured to said adaptor plate;

(f) said bearing surface extending along a plane intersecting said die opening; and (g) said die including a recess for receiving said bearing surface.

9. Apparatus as claimed in claim 8, wherein said die includes a die body having driving means for engagement with said means for radial engagement so as to rotate said die relative said extruder.

10. Apparatus as claimed in claim 9 further including cam followers for pressing said die body against said adaptor plate.

11. Apparatus as claimed in claim 10, wherein said driving means comprises a gear.

12. Apparatus as claimed in claim 11 wherein said die opening includes at least two circular openings.

13. Apparatus as claimed in claim 11, wherein said die opening has at least three sides.

14. Apparatus as claimed in claim 11, wherein said bearing surface is comprised of bronze.

* * * * *